(12) United States Patent
Yildizli (10) Patent No.: US 11,259,668 B2
(45) Date of Patent: Mar. 1, 2022

(54) COFFEE COOKING STAND

(71) Applicant: Turgay Yildizli, New Orleans, LA (US)

(72) Inventor: Turgay Yildizli, New Orleans, LA (US)

( * ) Notice: Subject to any disclaimer, the term of this patent is extended or adjusted under 35 U.S.C. 154(b) by 295 days.

(21) Appl. No.: 16/342,221

(22) PCT Filed: Oct. 16, 2017

(86) PCT No.: PCT/TR2017/000108
§ 371 (c)(1),
(2) Date: Apr. 16, 2019

(87) PCT Pub. No.: WO2019/083465
PCT Pub. Date: May 2, 2019

(65) Prior Publication Data
US 2020/0305649 A1  Oct. 1, 2020

(30) Foreign Application Priority Data
Oct. 17, 2016  (TR) .................................. 2016/14567

(51) Int. Cl.
*A47J 47/16* (2006.01)
*A47J 31/44* (2006.01)

(52) U.S. Cl.
CPC ........... *A47J 47/16* (2013.01); *A47J 31/4432* (2013.01)

(58) Field of Classification Search
CPC .... A47J 47/16; A47J 31/4432; A47J 31/4435; A47J 31/44; A47J 31/4403; A47J 31/02; A47J 31/18; A47J 31/16; A47J 31/0636; A47J 47/00; B60N 3/10

USPC ......... 99/306, 304, 291, 449; 248/311.2–313
See application file for complete search history.

(56) References Cited

U.S. PATENT DOCUMENTS

| | | | | |
|---|---|---|---|---|
| 1,157,778 | A * | 10/1915 | Baker | A47G 29/1216 248/145 |
| 2,780,081 | A * | 2/1957 | Alexander | A47J 31/44 141/341 |
| D289,726 | S * | 5/1987 | Greutert | D7/310 |
| D341,520 | S * | 11/1993 | LaBelle | D15/199 |
| 5,730,522 | A * | 3/1998 | Wyke | F21V 19/00 248/200 |
| 5,865,094 | A * | 2/1999 | Kealy | A47J 31/007 99/291 |
| 6,240,830 | B1 * | 6/2001 | Goldston | A47J 31/44 99/279 |
| 6,330,849 | B1 | 12/2001 | Chao | |
| 6,588,463 | B2 * | 7/2003 | Swan | B67C 11/02 141/106 |
| 7,858,133 | B2 | 12/2010 | Neace, Jr. | |
| 9,808,114 | B1 * | 11/2017 | Heys | A47J 31/52 |

(Continued)

OTHER PUBLICATIONS https://www.instagram.com/p/BGI73wOKxFx/?igshid=1be3pf4tkz37i (published Jun. 2016).*

(Continued)

*Primary Examiner* — Hiwot E Tefera
(74) *Attorney, Agent, or Firm* — Bayramoglu Law Offices LLC (57) ABSTRACT

A coffee cooking stand according to the present invention basically includes a stand having at least one stand base, at least one stand column and at least one stand upper wall, and at least one basket placed on the stand upper wall or on the stand base.

10 Claims, 8 Drawing Sheets

(56) References Cited

U.S. PATENT DOCUMENTS

| | | | |
|---|---|---|---|
| 2005/0258318 A1 | 11/2005 | Mori | |
| 2008/0179935 A1 | 7/2008 | Blossom | |
| 2009/0078714 A1* | 3/2009 | Peacock | A47G 23/0216 |
| | | | 220/710.5 |
| 2009/0173862 A1* | 7/2009 | Lota | B60N 3/10 |
| | | | 248/311.2 |
| 2013/0019755 A1* | 1/2013 | Tien | A47J 31/02 |
| | | | 99/279 |
| 2014/0239134 A1* | 8/2014 | Webb | A47G 23/0225 |
| | | | 248/125.3 |
| 2014/0305312 A1* | 10/2014 | Lin | A47J 31/4403 |
| | | | 99/275 |

OTHER PUBLICATIONS https://prima-coffee.com/blog/article/scaa-atlanta-2016-recap/32424 (published May 10, 2016).*
https://www.instagram.com/p/6imDFKKxHo/?igshid=17o3taxvv1xzp (published Aug. 2015).*

* cited by examiner

COFFEE COOKING STAND

CROSS REFERENCE TO THE RELATED APPLICATIONS

This application is the national phase entry of International Application No. PCT/TR2017/000108, filed on Oct. 16, 2017, which is based upon and claims priority to Turkish Patent Application No. 2016/14567, filed on Oct. 17, 2016, the entire contents of which are incorporated herein by reference.

TECHNICAL FIELD

This invention relates to a coffee cooking and brewing stand. This invention particularly relates to a stand arrangement to be used for cooking and brewing Turkish coffee in various styles. The stand comprises at least one heater, at least one support body and at least one holder for heating water, cooking and brewing coffee.

BACKGROUND

Together with the developments in coffee culture and consumption lately, novel brewing methods and devices have been developed and invented. The invention of novel methods and devices promises opportunities for consumers to brew more tasty coffees. At the same time, scientific researches seek ways to find out the best taste characteristics of coffee, ranging from agriculture and processing to roasting, preparation and the presentation of coffee. All these efforts and developments provide the users and consumers with the possibility to take better control of the variables of preferred brewing methods and consequently to have a more tasteful and pleasant coffee experience.

Different brewing methods require different main and auxiliary brewing devices. However, any new coffee equipment requires extra space and constitutes extra cost for home users who are to prepare coffee using different brewing methods and devices, as well as for commercial establishments such as coffeehouses, restaurants and hotels which are to offer different coffee alternatives to their guests or clients.

Tens of different coffee stands are available, which are used for manual filter coffee brewing methods and are aiming at providing different advantages by controlling the variables of the method in different aspects. However, since they are designed for a single brewing method, they do not operate in compliance with different brewing methods and equipment. They are not expected to be easily portable as they are intended for a single-purpose use. The available stands do not provide an ease of use in indoors and outdoors. On the other hand, since the stands are produced from different materials with visual design concerns (e.g. wood, copper, glass etc.), the durability and the service life of the resulting products are influenced negatively.

No multi-purpose stand design has been encountered in the prior art, which is designed for cooking and brewing coffee, particularly Turkish coffee. Those which have been encountered are generally designs for Turkish coffee pots or cups, as well as coffee cookers or coffee brewing machines in terms of devices.

In the U.S. Pat. No. 7,858,133 according to the prior art is described a coffee machine. It is seen that said coffee machine has a stand-shaped leg. However, said leg appears to be peculiar only to said machine and to function as a support and heater that works together with the body of that machine.

Another patent document according to the prior art is the US patent document US2008179935. Said patent document describes a leg mechanism to be used in furniture and it appears that it is rather designed for use in serving bear and similar beverages.

A further patent document according to the prior art is the U.S. Pat. No. 6,330,849. Said patent document is related to an electrical tea or coffee machine. A stand described in said patent document is used to heat a tea cup or coffee cup (teapot) and to brew the same, and has a cup holder at an upper side thereof.

Another patent document according to the prior art is the US patent document US2005258318. In said patent document is described a hook designed to provide the possibility of placing a tea cup or coffee cup beneath the hook so that something that is hanging from said hook can be inserted into the cup.

SUMMARY

The object of the coffee cooking stand according to the present invention is to provide a practical and ergonomic design which may be used for alike but different purposes such as coffee cooking, coffee brewing or water heating.

An advantage of the coffee cooking stand according to the present invention is that it can be used together with cookers particularly used for cooking Turkish coffee. In the stand design according to the present invention, a cooker is placed to a lower side and a Turkish coffee pot containing coffee to be cooked is placed to an upper side so that an easy and safe cooking operation can be carried out. A metallic basket used together with said stand eliminates the overturning risk of a Turkish coffee pot placed therein.

Another advantage of the coffee cooking stand according to the present invention is that it serves as a cooker stand for heater- (kettle) or teapot-like vessels used for heating water required for manual filter coffee brewing. Using a heater or teapot placed to an upper side of the stand and an electric or gas burner placed to a lower side of the stand, a safe heating operation can be carried out at any kitchens, offices, or in outdoors. In terms of the design of the stand according to the present invention, manual filter coffee brewing devices, which can be classified according to two main operation principles as immersion and dripping plus filtering, can be used either by being placed directly over a cup, glass, pot, or on the stand according to the present invention due to better safety and easier cleaning.

The coffee cooking stand according to the present invention can be easily assembled, easily used, easily carried, easily cleaned, but is durable and reliable.

In order to provide a better understanding of the stand according to the present invention, it shall be referred to the figures briefly described below.

REFERENCE NUMBERS OF PARTS AND SECTIONS IN FIGURES ILLUSTRATING THE PRESENT INVENTION

1. Stand
   1a—Stand base
   1b—Stand column
   1c—Stand upper wall
   1d—Gap
   1e—Heat transmission opening
   1f—Leg slot
   1g—Upper surface of stand without basket
   1h—Upper surface gap of stand without basket
2. Basket
   2a—Basket support/carrier surface
   2b—Basket surface gap
   2c—Basket support/carrier legs
   2d—Leg hooks
   2f—Leg bending recess
3. Heater
4. Turkish coffee pot
5. Teapot
6. Brewing device
7. Brewing vessel
8. Multi-vessel stand
   8a—Base surface
   8b—Side support
   8c—Upper surface
   8d—Upper surface gap
   8e—Leg recess
   8f—Side cover

DETAILED DESCRIPTION OF THE EMBODIMENTS

The coffee cooking stand according to the present invention is basically designed as a Turkish coffee cooking stand, but it can also suitably be used for heating water, brewing, heating and brewing tea, serving and similar purposes besides cooking coffee. Therefore the term "coffee cooking stand" is not to be taken as binding.

Figure 1:
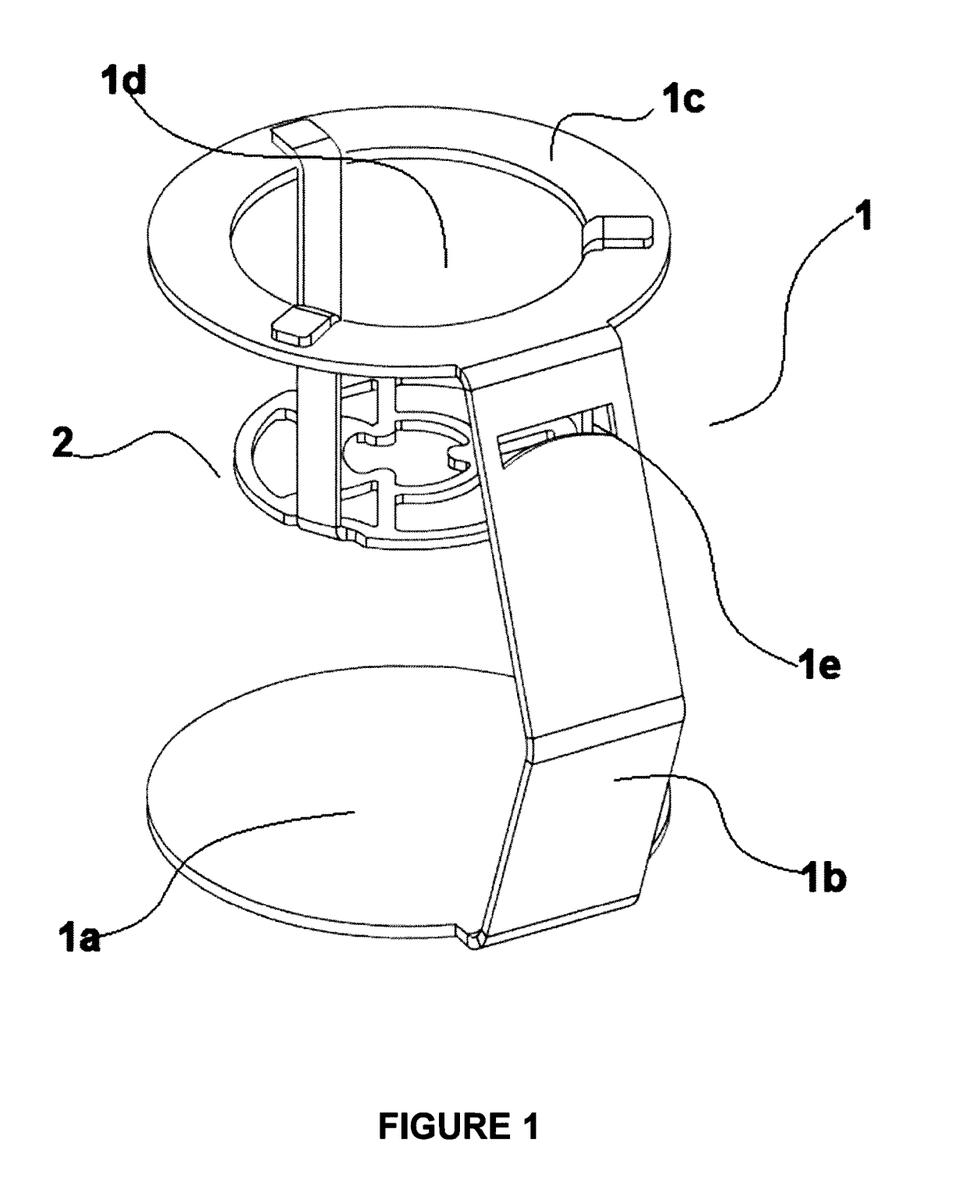
FIG. 1 is a perspective view of a coffee cooking stand according to the present invention, along with a basket.
Figure 2:
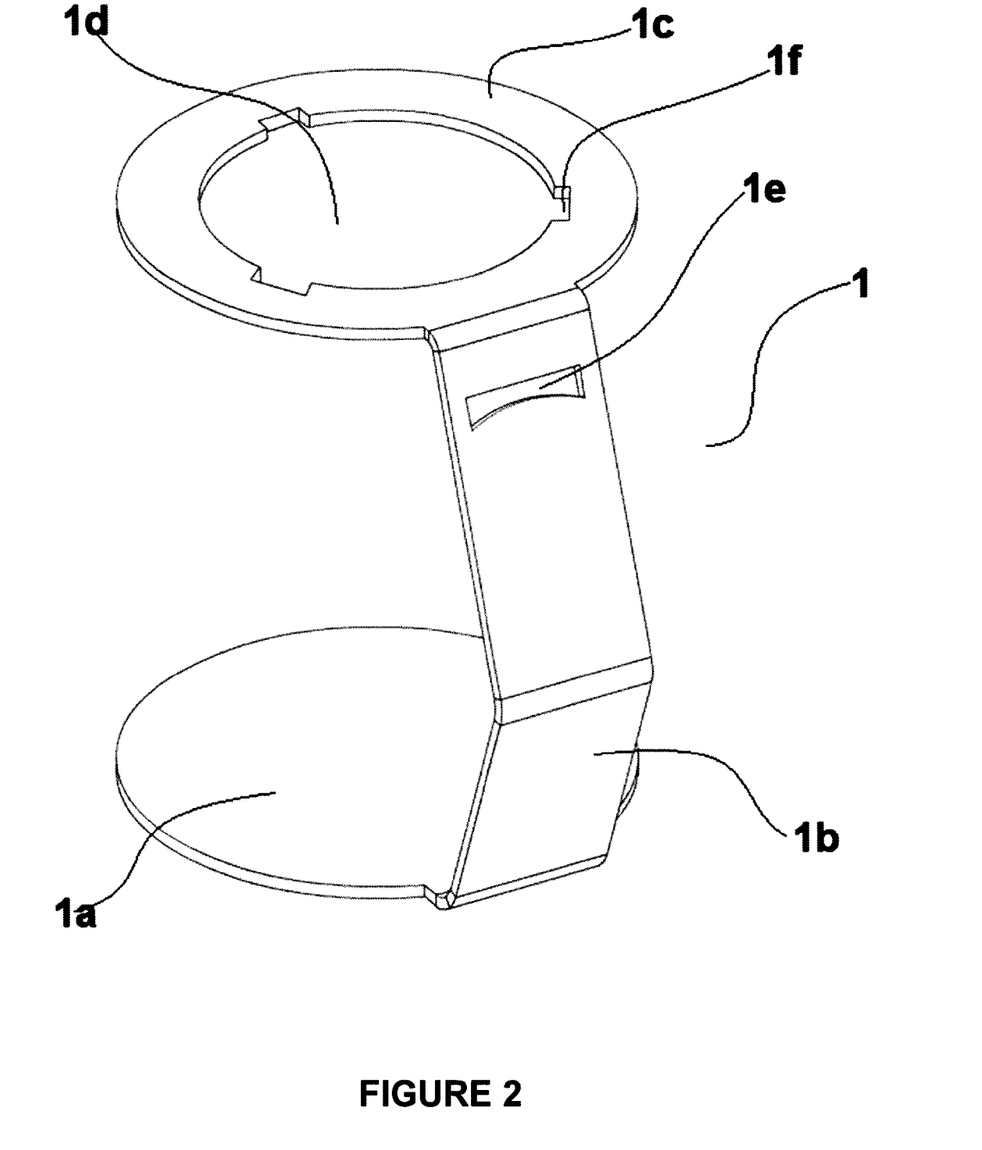
FIG. 2 is a perspective view of the coffee cooking stand according to the present invention without the basket.
Figure 3:
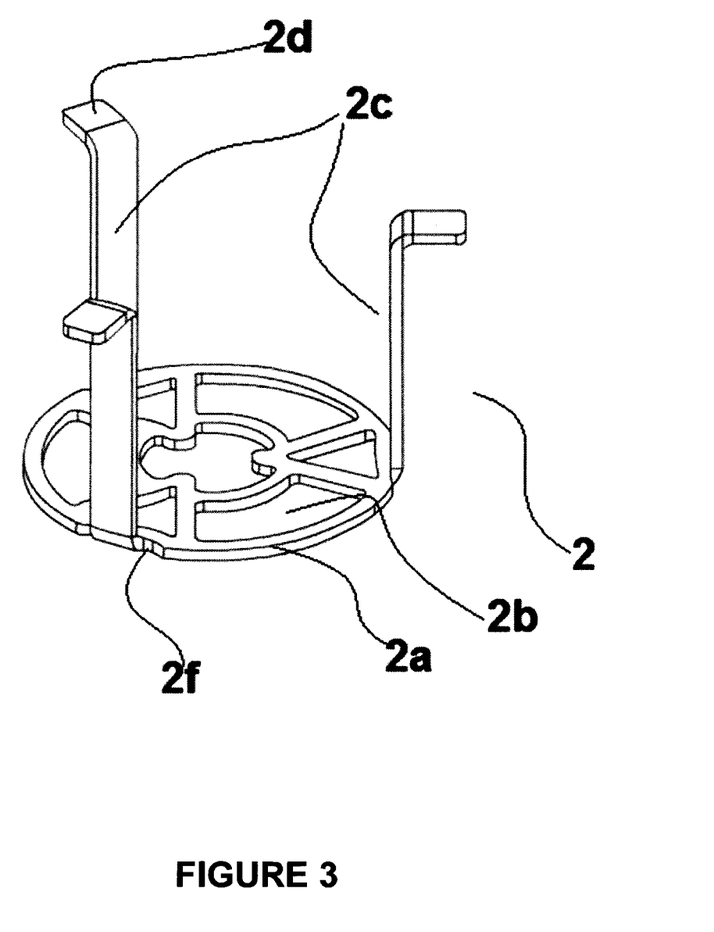
FIG. 3 is a perspective view of a basket used in the coffee cooking stand according to the present invention.
Figure 4:
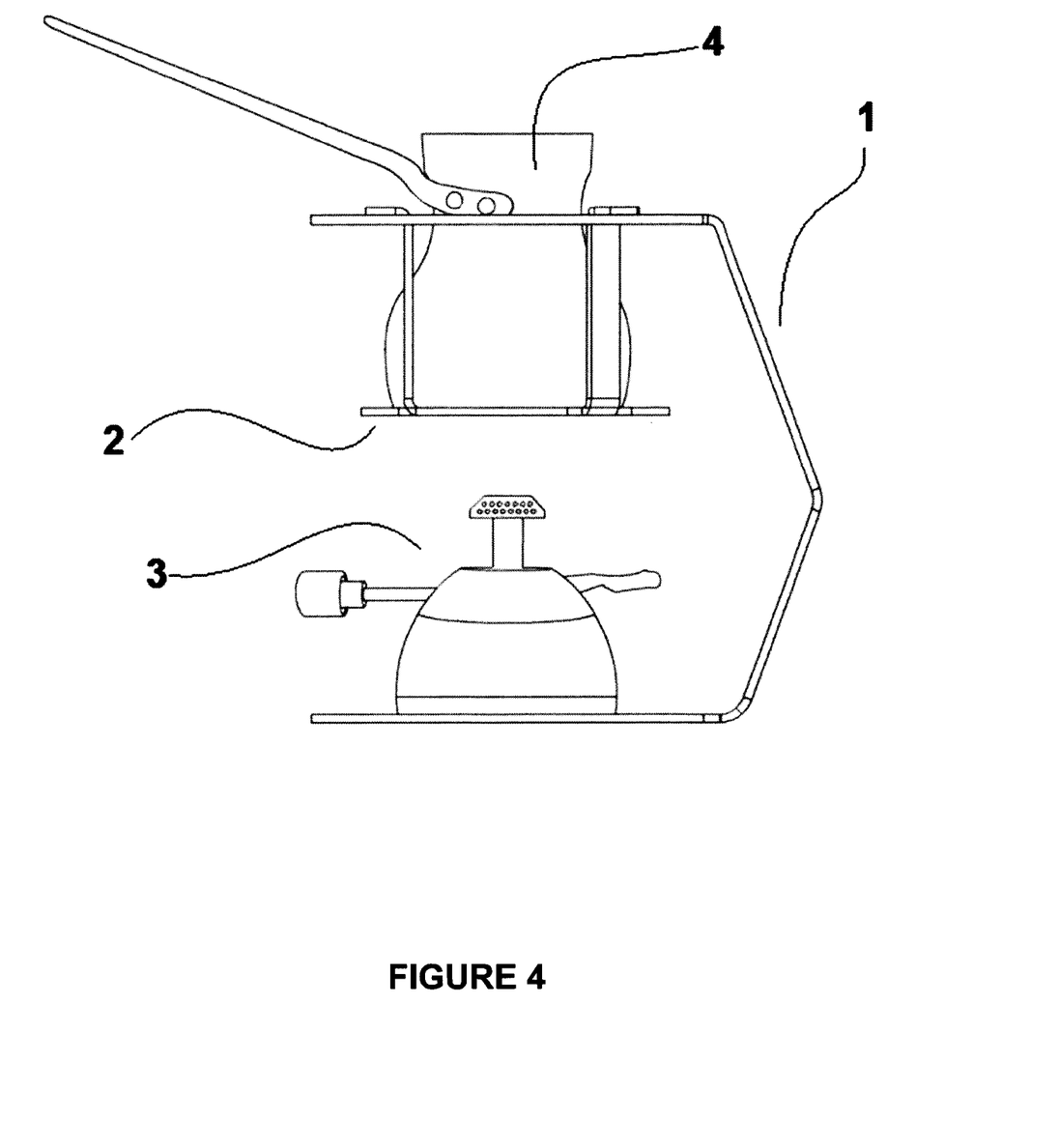
FIG. 4 is a side view of the coffee cooking stand according to the present invention as it is used together with a heater and a Turkish coffee pot.
Figure 5:
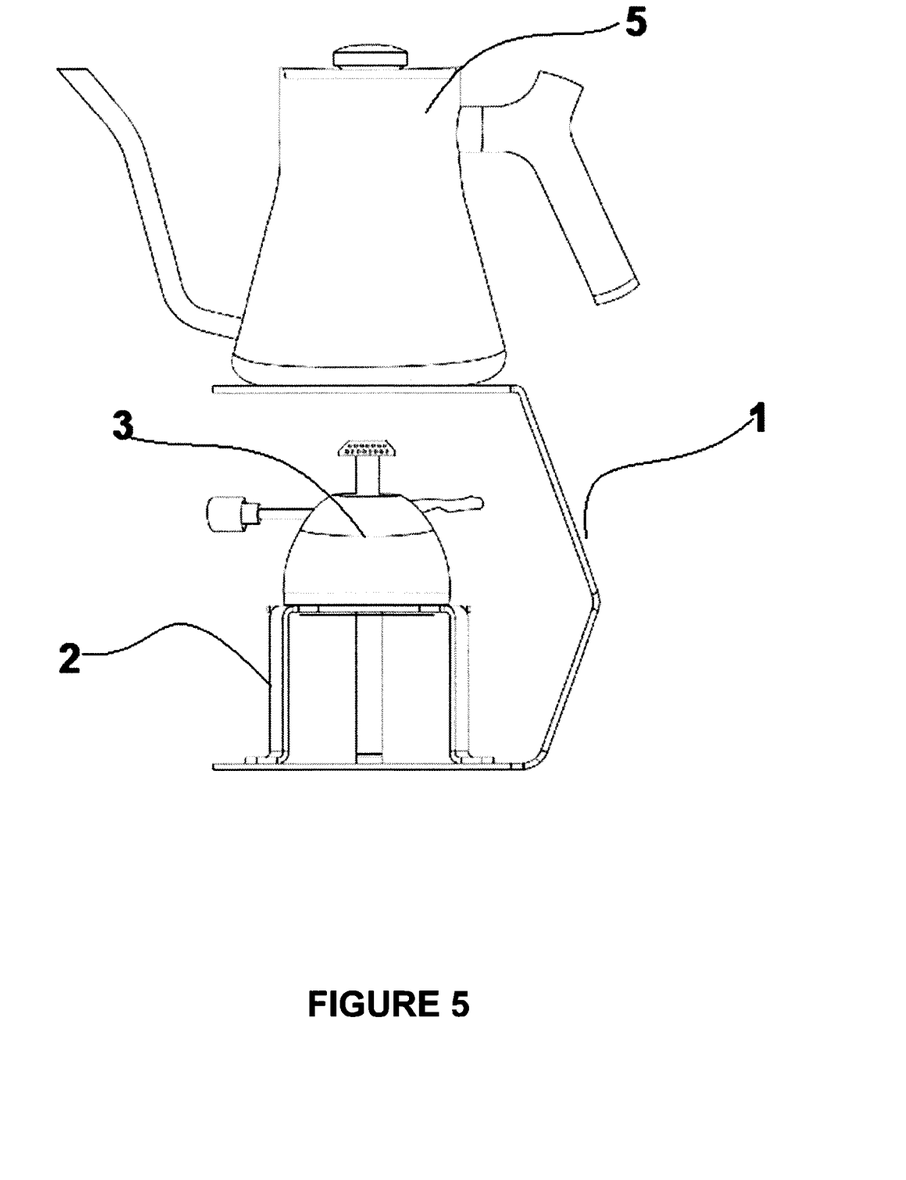
FIG. 5 is a side view of the coffee cooking stand according to the present invention as it is used together with a heater and a teapot.
Figure 6:
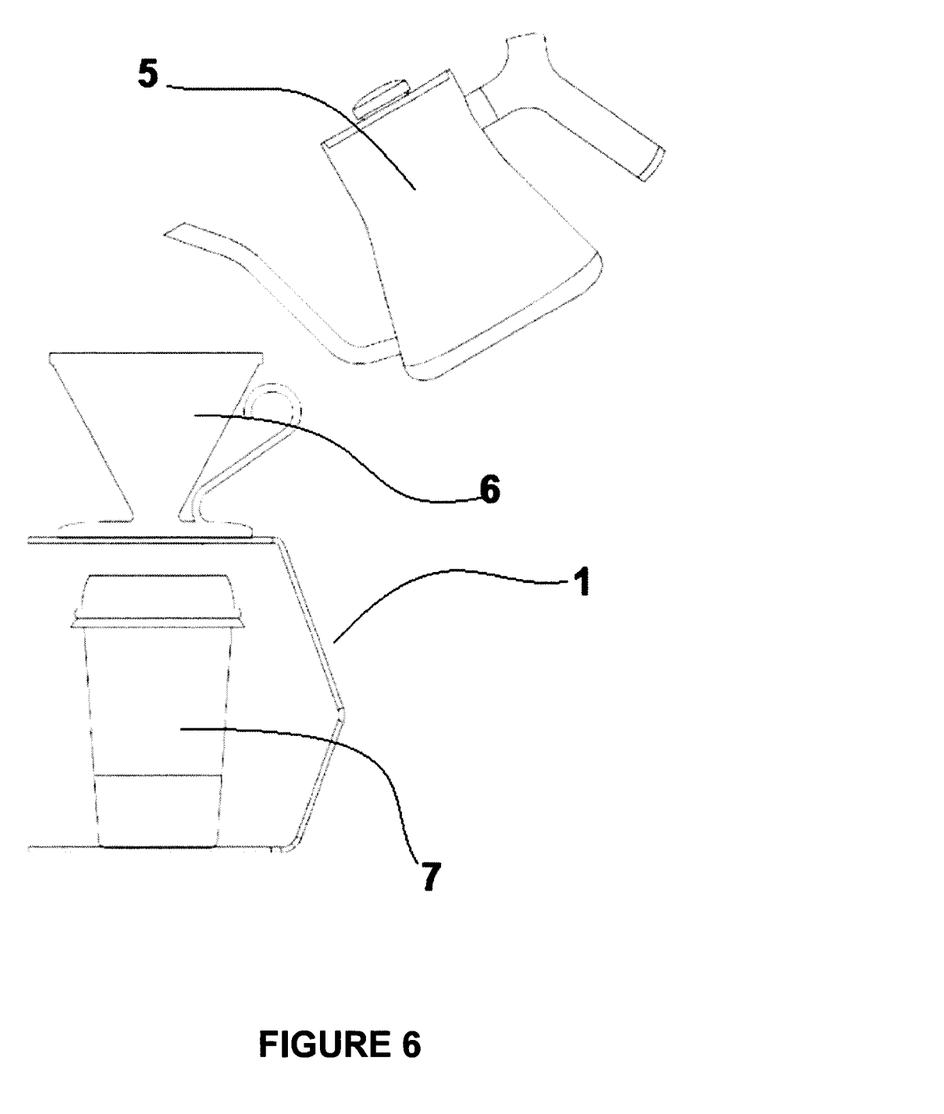
FIG. 6 is a side view of the coffee cooking stand according to the present invention as it is used together with a teapot and a brewing device and brewing vessel.
Figure 7:
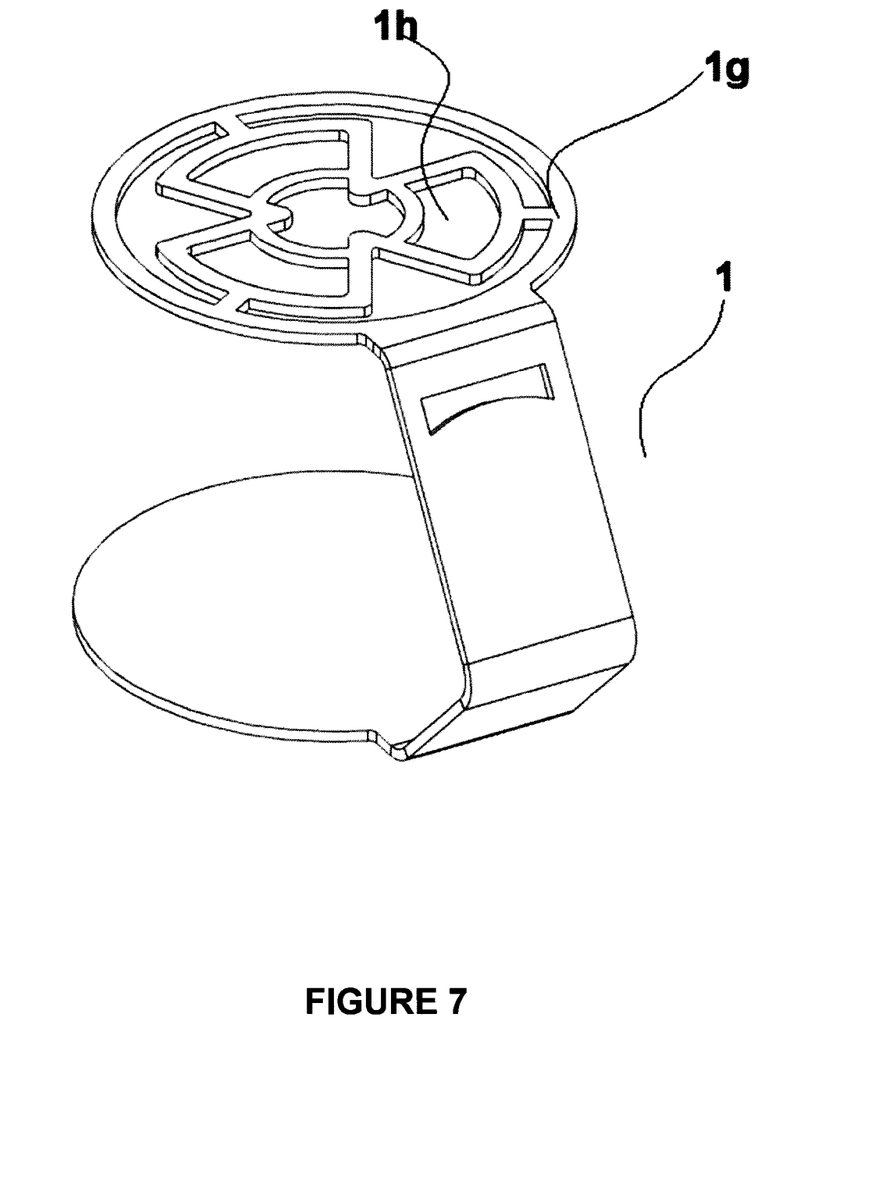
FIG. 7 is a perspective view of a version of the subject coffee cooking stand, without the basket, illustrating heat-transmitting channels thereof.
Figure 8:
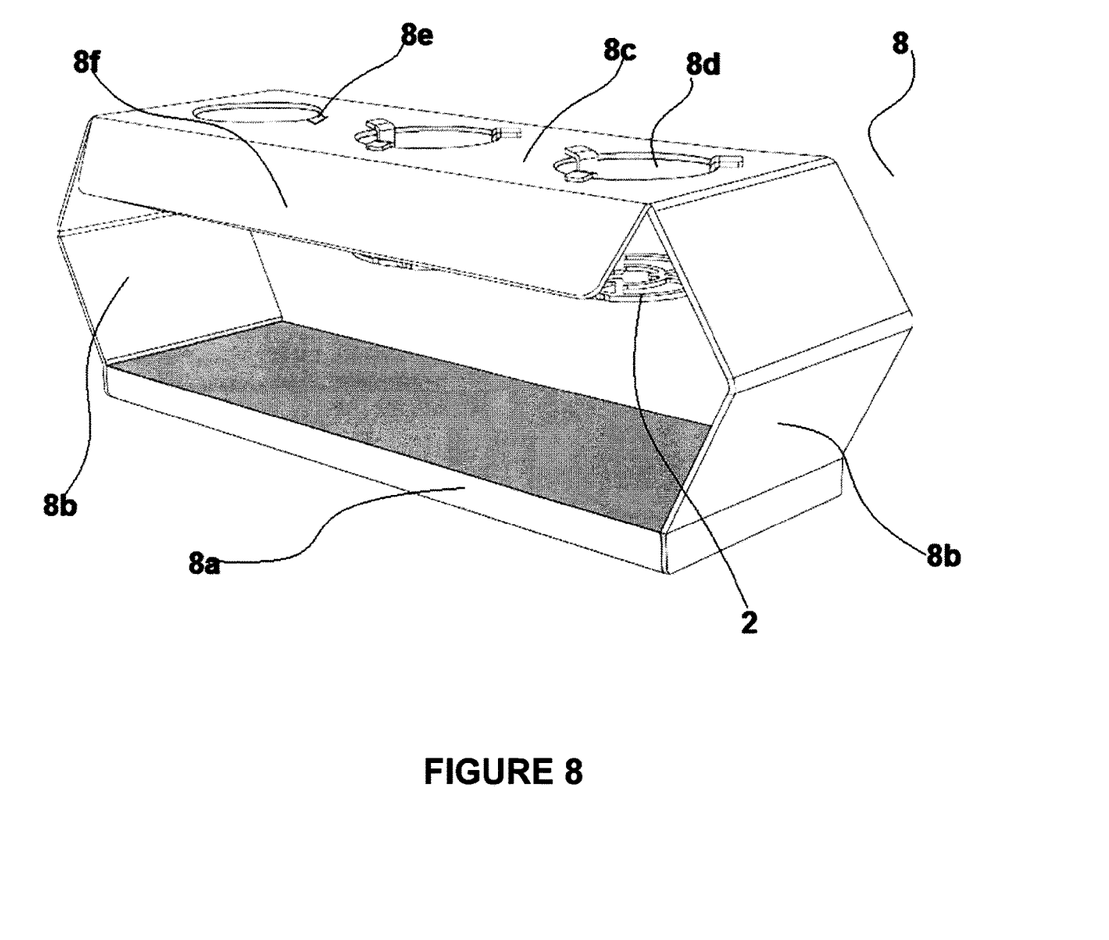
FIG. 8 is a perspective illustration of a conceptual design of a multiple version of the coffee cooking stand according to the present invention.

As illustrated in FIG. 1, FIG. 2, and FIG. 3, the coffee cooking stand according to the present invention is basically composed of a stand (1) and a basket (2). The stand (1) and the basket (2) can be used for different purposes, as illustrated in FIG. 4, FIG. 5, and FIG. 6. FIG. 7 shows a basket-free version of the stand (1), whereas FIG. 8 illustrates a multi-stand version (with which several heaters and coffee pots can be used). The coffee cooking stand according to the present invention basically comprises a stand having at least one stand base (1a), at least one stand column (1b) and at least one stand upper wall (1c), as well as at least one basket (2) placed either above, on the stand upper wall (1c), or below, on the stand base (1a) of the stand (1). The stand base (1a) of the stand (1) according to the present invention can have a plane bottom surface or a plane bottom surface provided with feet to provide a balanced and stable positioning of the stand base (1a) when it is placed on a table or counter. The stand upper wall (1c), which is the upper side of the stand (1), preferably has a circular form, but it can alternatively have a square, oval or another form, including preferably a circular gap (1d), or alternatively a square, oval or another gap therein, the stand upper wall (1c) having at least two, preferably at least three leg slots (1f) corresponding to the interior of the wall (1c), i.e. to the gap (1d). The leg slots (1f) are recesses to which the leg hooks (2d) of the basket (2) are mounted. The stand (1) according to the present invention comprises at least one stand column (1b) which laterally couples the stand base (1a) and the stand upper wall (1c) together and supports the stand upper wall (1c) and therefore any loads thereon. The stand base (1a), the stand upper wall (1c) and the stand column (1b) are preferably made of the same material and are monolithic. However, these parts can also be fixed to each other by means of welding, screws, pins, or snap-fit couplings either from the same or from different materials. Such materials can be steel, iron, aluminum, alloys, or heat-resistant composite materials, wood, or plastic. The stand column (1b) is preferably curved outward from its middle part. This curve can have a straight or sloped structure in the form of a triangle. The stand column (1b) comprises a heat transmission opening (1e) towards its upper side. The heat transmission opening prevents heat from being transmitted to the entire stand surface during cooking so that the stand column (1b) can be safely held even after cooking. The basket (2) used in the design of the stand according to the present invention comprises a basket support/carrier surface (2a) by which a Turkish coffee pot or another vessel is supported/carried, large or small basket surface gaps (2b) which allow the basket support/carrier surface (2a) to have a grid-like or bored surface, basket support/carrier legs (2c) supporting/carrying the basket, and leg hooks (2d) which carry the basket like a hook from the tips of the basket support legs (2c) or which serve as a leg on the ground. The basket support/carrier legs (2c) can be monolithic with the basket support/carrier surface (2a) from the same material, or can be made from different materials and mounted to each other. The material of the basket (2) can be steel, iron, alloy, aluminum, composite material or fire-resistant plastic or wood. The basket support/carrier surface (2a) has leg bending recesses (2f) which are preferably formed inward when the basket support/carrier legs (2c) are formed. As illustrated in FIG. 1, the basket (2) can be placed into the gap (1d) provided in the stand upper wall (1c) so that the leg hooks (2d) are mounted into the leg slots (2f). As a result of this mounting form, a Turkish coffee pot (4) can be placed into the basket (2). Beneath the Turkish coffee pot (4), in turn, can be placed a gas or electric burner (3) such that the pot (4) is directly heated from below and at the same time, any overturning of the pot (4) is prevented. If a teapot (5) is placed instead of a Turkish coffee pot (4), there may be no need for the basket (2). Again at the upper part, a brewing device (6) can be placed and while brewing is made using a teapot (5) or another vessel, the lower part can be used to brew coffee or another beverage, or another brewing vessel (7) can be used for another purpose. Similarly, as illustrated in FIG. 5, the basket (2) can be placed on the stand base (1a) such that the basket support/carrier legs (2c) face downward and a heater (3) can be placed thereon. The stand (1) according to the present invention can be used without basket, or as illustrated in FIG. 7, can have on its upper surface a basket-free stand upper surface (1g) and a basket-free upper surface gap (1h) in said basket-free stand upper surface (1g) allowing heat to be transferred upward.

If the stand (1) according to the present invention is to be used to place more than one Turkish coffee pot or teapot for cooking, brewing or heating purposes, a multi-stand, i.e. a multi-vessel stand (8) can be used as illustrated in FIG. 8. Here the multi-vessel stand (8) comprises at least one base surface (8a), at least two side supports (8b), at least one upper surface (8c), and at least one surface gap (8d) in said upper surface (8c). Here the side support (8b) is preferably protruding outwards and this protrusion can be curved or vertical in the form of a triangle. The upper surface (8c) comprises preferably a leg recess (8e) to which the basket (2) is mounted after it is passed through the upper surface gap (8d). A side cover (8f) is provided for improving the appearance, enhancing the strength of the upper surface (8c) and for providing protection against flames. It may optionally be omitted. The design given in FIG. 8 is like a rectangular prism and has three wells, i.e. three upper surface gaps (8d), but this number can also be two, four or more. Its geometric shape, in turn, can alternatively be a square prism, oval prism, semicircular, elliptic etc.

The stand design according to the present invention is basically for use in cooking Turkish coffee with a Turkish coffee cup. However, it can alternatively be used for filtering and brewing coffee, boiling and brewing tea, serving other beverages or even cooking and keeping meals warm.

What is claimed is:

1. A coffee cooking stand, comprising a stand, and at least one basket;
   wherein
   the stand comprises at least one stand base, at least one stand column, and at least one stand upper wall; and
   the at least one basket is placed on the at least one stand upper wall, or on the at least one stand base, wherein the at least one stand upper wall is an upper side of the coffee cooking stand; the at least one stand upper wall is in a circular form with a circular gap therein, a square form with a square gap therein, or an oval form with an oval gap therein; and the at least one stand upper wall comprises at least two leg slots corresponding to an interior of the at least one stand upper wall, and the interior is the circular gap, the square gap, or the oval gap,
   wherein the at least one stand column comprises a heat transmission opening towards an upper side of the at least one stand column,
   wherein the at least one basket comprises a basket carrier surface for supporting a Turkish coffee pot or a Turkish coffee vessel, a plurality of bores formed in the basket carrier surface, the at least one basket further comprises a plurality of basket carrier legs, each carrier leg configured to be inserted in a respective leg slot of the at least two leg slots to support the at least one basket on the at least one stand upper wall;
   wherein the plurality of basket carrier legs each comprise a hook at a tip of the respective carrier leg;
   wherein each hook is capable of supporting the at least one basket on the at least one stand upper wall or when the at least one basket is placed on a horizontal surface.

2. The coffee cooking stand according to claim 1, wherein the at least one stand column laterally couples the at least one stand base with the at least one stand upper wall together, and supports the at least one stand upper wall and a load on the at least one stand upper wall.

3. The coffee cooking stand according to claim 2, wherein the at least one stand base, the at least one stand upper wall, and the at least one stand column is an integrated structure made of a same material, or, the at least one stand base, the at least one stand upper wall, and the at least one stand column respectively made of a same material or different materials are fixed to each other by welding, screws, pins, or snap-fit couplings.

4. The coffee cooking stand according to claim 2, wherein the at least one stand column is curved outward from a middle part to form a curve, the curve comprises a straight structure or a sloped structure in a form of a triangle.

5. The coffee cooking stand according to claim 1, wherein the at least one stand base, the at least one stand upper wall, and the at least one stand column is an integrated structure made of a same material, or, the at least one stand base, the at least one stand upper wall, and the at least one stand column respectively made of a same material or different materials are fixed to each other by welding, screws, pins, or snap-fit couplings.

6. The coffee cooking stand according to claim 5, wherein the at least one stand column is curved outward from a middle part to form a curve, the curve comprises a straight structure or a sloped structure in a form of a triangle.

7. The coffee cooking stand according to claim 1, wherein the at least one stand column is curved outward from a middle part to form a curve, the curve comprises a straight structure or a sloped structure in a form of a triangle.

8. The coffee cooking stand according to claim 1, wherein the plurality of basket carrier legs are monolithic with the basket carrier surface and made of a same material as a material of the basket carrier surface, or the plurality of basket carrier legs and the basket carrier surface made of different materials are mounted to each other.

9. The coffee cooking stand according to claim 1, wherein the basket carrier surface comprises a plurality of leg bending recesses, and the plurality of leg bending recesses are formed inward when the plurality of basket carrier legs are formed.

10. A coffee cooking stand comprising a stand, wherein the stand is a multi-vessel stand and at least one basket, and the multi-vessel stand comprises at least one base surface, at least two side supports, at least one upper surface, and at least one surface gap in the at least one upper surface,
    wherein the at least one basket comprises a basket carrier surface for supporting a Turkish coffee pot or a Turkish coffee vessel, a plurality of bores formed in the basket carrier surface, the at least one basket further comprises a plurality of basket carrier legs, each carrier leg configured to be inserted in a respective leg recess of at least two leg recesses to support the at least one basket on the at least one stand upper surface;
    wherein the plurality of basket carrier legs each comprise a hook at a tip of a respective carrier leg;
    wherein each hook is capable of supporting the at least one basket on the at least one stand upper surface or when the at least one basket is placed on a horizontal surface.

* * * * *